United States Patent [19]

Hall

[11] 3,776,662
[45] Dec. 4, 1973

[54] AUTOMATIC AIR VALVE CONTROL APPARATUS
[76] Inventor: Ellis C. Hall, Rt. 2, P.O. Box 107, Gautier, Miss. 37553
[22] Filed: Apr. 17, 1972
[21] Appl. No.: 244,763

[52] U.S. Cl.................................. 417/37, 417/110
[51] Int. Cl.......................... F04b 49/00, F04f 1/18
[58] Field of Search...................... 417/110, 37, 42, 417/38; 137/486, 477, 403; 73/134, 215

[56] References Cited
UNITED STATES PATENTS

| | | | |
|---|---|---|---|
| 321,777 | 7/1885 | Wooster | 417/37 X |
| 625,339 | 5/1899 | Krueger | 137/403 P |
| 1,981,477 | 11/1934 | Subkow | 417/110 X |
| 2,619,906 | 12/1952 | Gardenhour | 417/37 |
| 2,724,401 | 11/1955 | Page | 417/403 |
| 2,786,418 | 3/1957 | Peck | 417/37 X |

FOREIGN PATENTS OR APPLICATIONS 761,399 11/1956 Great Britain........................ 417/37

Primary Examiner—Carlton R. Croyle
Assistant Examiner—Richard E. Gluck
Attorney—Harvey B. Jacobson

[57] ABSTRACT

An apparatus particularly for controlling the amount of air supplied to an air-lift pump used for pumping return sludge from a clarifier section to an aeration section of a sewage and waste treatment plant. A weir is arranged for diverting a portion of a flow from a flow path created by the air-lift pump. This diverted flow portion is fed to an arrangement including a pair of troughs for weighing the diverted flow portion. One arm of a balance beam is connected to one of the troughs and to an air control valve for regulating the air supplied to the air-lift pump as a function of the weight of the diverted flow portion. The trough connected to the regulating arrangement is connected to the other trough at an end spaced from its connection to the regulating arrangement by a device for inversely duplicating in the trough a displacement of the other trough, resulting in the spaced end of the trough being displaced by the other trough and the rate of flow in the trough being thus varied. As a, for example, heavier sludge or other material flows through the trough and into the other trough, the material receiving end of the trough will be raised resulting in the trough holding less material, and a counterweight on the other balance beam arm will move the end of the trough connected to the balance beam upwardly and increase the supply of air to the air-lift pump. A lighter sludge or other material flowing into the other trough reverses this procedure.

6 Claims, 6 Drawing Figures

To Aeration Section

From Clarifier Section

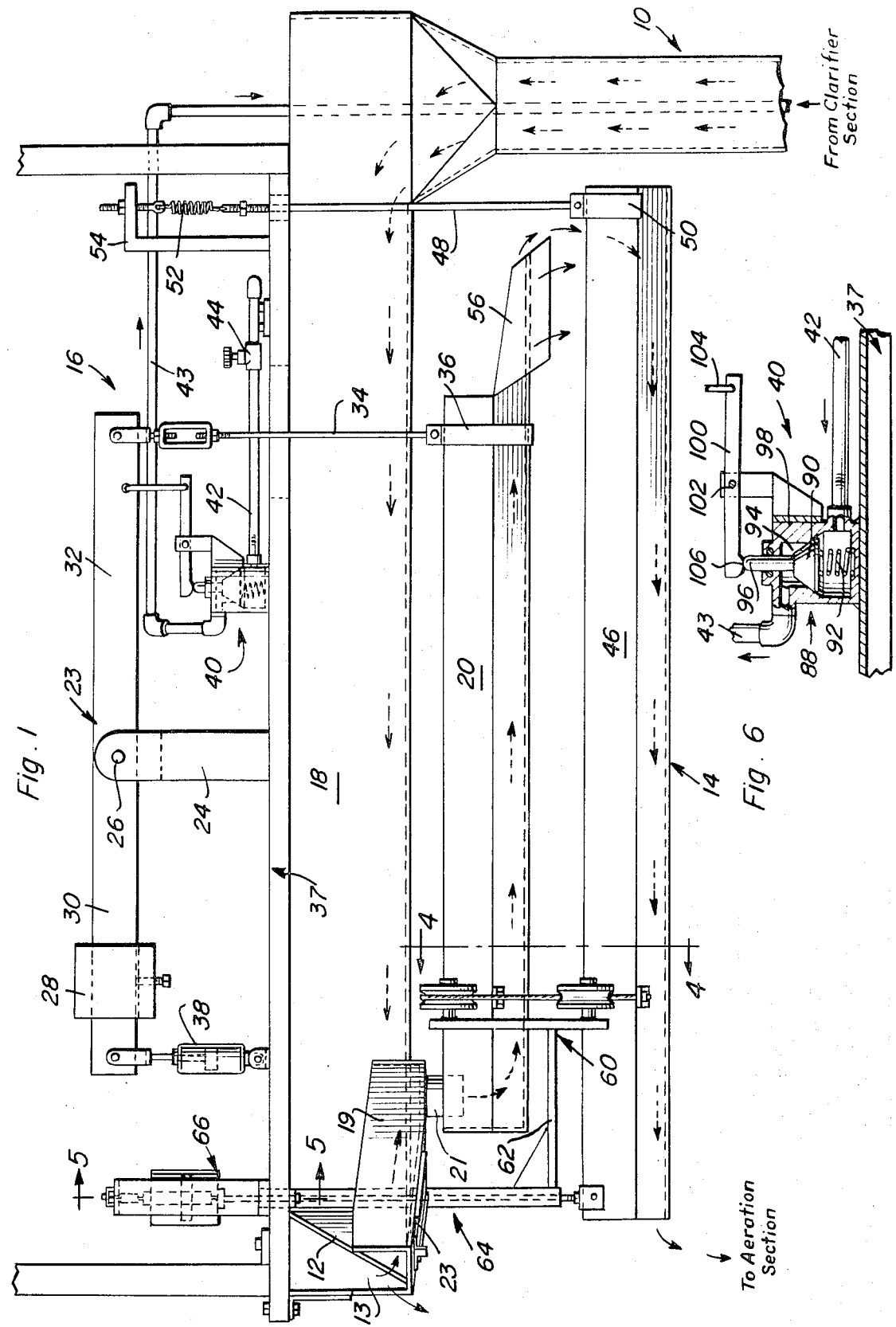

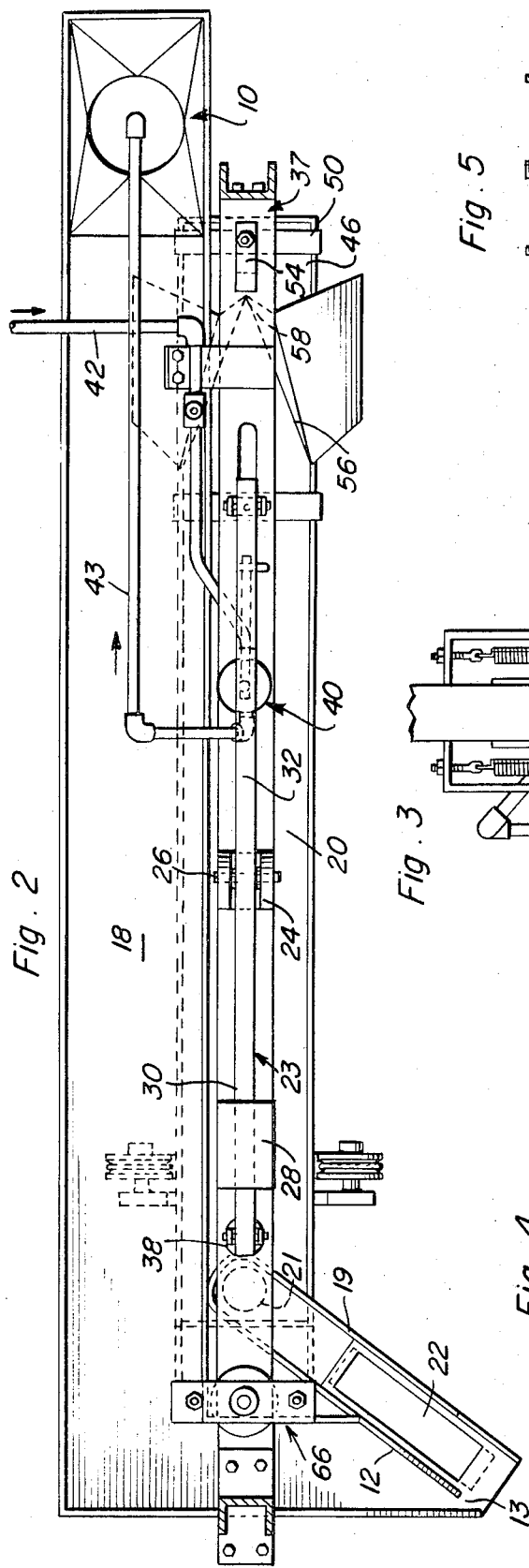
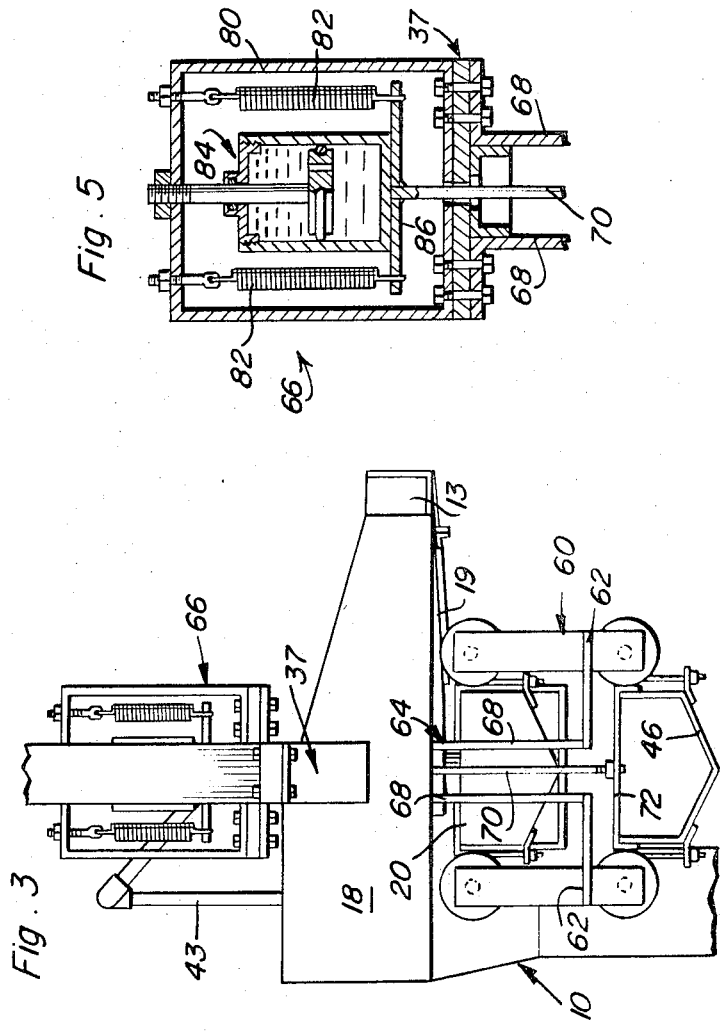
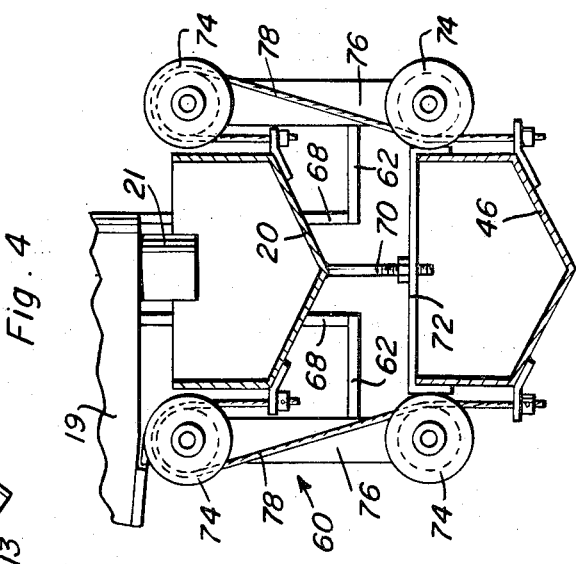

AUTOMATIC AIR VALVE CONTROL APPARATUS

BACKGROUND OF THE INVENTION

1. Field of the Invention

This invention relates in general to an apparatus for regulating the impetus to a flow in a flow path as a function of a quantitative measurement of the flow. In particular, this invention relates to such an apparatus for use in controlling the amount of air supplied to an air-lift pump used for pumping return sludge from a clarifier section to an aeration section of a sewage and waste treatment plant.

2. Description of the Prior Art

One of the most important factors in operating sewage and waste treatment plants at peak efficiency relates to the control of the air supply to the return sludge air-lift pump. This return sludge air-lift pump returns sludge from the bottom of a clarifier section of the plant to the aeration section thereof for recycling. In a small treatment plant, the sludge must be pumped continuously and at a fixed volume to maintain an acceptable culture in the aeration section and a clear water zone in the clarifier section for final effluence. Efficient performance of this operation is dependent upon proper control of the air supply by means of an air valve incorporated in the air-lift apparatus. Proper air supply control is a very critical problem in practically all sewage and waste treatment plants. The majority of these problems relate to the variation in load between peak and non-peak operating hours, the former being generally from 6:00 A.M. to 12:00 P.M. and the latter from 12:00 P.M. to 6:00 A.M. A large volume of sludge tends to accumulate in the clarifier section during the peak operating hours. The opposite is true during non-peak operating hours. Accordingly, in order to maintain an acceptable aeration culture at a constant level for the clear water zone of the clarifier, a larger or smaller volume of sludge must be returned to the aeration section during respective peak and non-peak hours. The present practice is to transfer sludge from the clarifier to the aeration section by an air-lift pump operating on a fixed manual air supply valve setting usually determined by computing an average between the peak and non-peak operating loads, since the constant manual attention that would be required for operation in each situation is impractical for the average plant.

It is known to control a flow, as shown in, for example, U. S. Pat. Nos. 1,155,473; 1,406,323; and 1,646,753, by the use of weight-responsive regulating devices. However, none of these known weight-responsive regulating devices are suitable for use in controlling the air supply to an air-lift pump such as used in sewage and waste treatment plants.

SUMMARY OF THE INVENTION

It is an object of the present invention to provide an apparatus for automatically regulating the impetus to a flow in a flow path as a function of a quantitative measurement of the flow.

It is a specific object of the present invention to provide an apparatus for controlling the amount of air supplied to an air-lift pump used for pumping return sludge from a clarifier section to an aeration section of a sewage and waste treatment plant.

These and other objects are achieved according to the present invention by providing means for making a quantitative measurement of a flow in a flow path, and means for regulating the impetus to the flow in the flow path as a function of the measurement made by the measuring means.

According to a preferred embodiment of the present invention, the measuring means continuously makes quantitative measurements of a flow portion diverted from the flow path.

The measuring means may have a displaceably mounted trough defining a flow channel connected to the regulating means and arranged for receiving the diverted flow portion. A further trough is arranged to receive from the trough at least a part of the diverted portion. This further trough is displaceably mounted at the ends thereof, and is connected to the trough at one of its ends for displacing the trough. The trough is connected to the regulating means at a one end and to the further trough at the other end. The troughs are preferably connected together by a means for inversely duplicating in the trough a displacement of the further trough. This arrangement results in only the other end of the trough being displaced by the further trough, and the rate of flow in the trough being varied.

The regulating means advantageously has a pivotally mounted balance beam having a counterweight mounted on a one arm thereof and the other arm connected to the trough for movement thereby.

In a preferred application of the apparatus claimed in the present invention, the flow path is defined by an air-lift pump, and the means for regulating has an air control valve connected to its other arm for actuation thereby.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, side elevational view showing an apparatus according to the present invention.

FIG. 2 is a top plan view showing the apparatus of FIG. 1.

FIG. 3 is a fragmentary, end elevational view showing the apparatus of FIGS. 1 and 2.

FIG. 4 is a sectional view taken generally along the line 4—4 of FIG. 1.

FIG. 5 is a sectional view taken generally along the line 5—5 of FIG. 1.

FIG. 6 is a fragmentary, side elevational view, partly in section, showing a detail of an air supply control assembly for use with an apparatus according to the present invention.

DESCRIPTION OF THE PREFERRED EMBODIMENTS

FIGS. 1 and 2 of the drawing show an apparatus according to the present invention associated with an air-lift pump 10. Although a central air-pipe system is shown in the drawings, it is to be understood that any known, suitable air-lift pump system may be employed. Further, the control apparatus according to the present invention may be used with other conveying devices, such as troughed belts and the like. Pump 10 may be used for pumping return sludge from a clarifier section to an aeration section of a sewage and waste treatment plant. A weir 12 is arranged for receiving the return sludge, other polluted fluid, or other material from pump 10, and for diverting a portion of the material from the flow of material created by pump 10. This is shown by the flow arrows in FIG. 1. The undiverted portion of the flow passes through an opening 13 and falls by gravity into the aerator. An arrangement 14 is provided for continuously making quantitative measurements of the diverted flow portion. This arrangement 14 is connected to an arrangement 16 for regulating the air supplied to pump 10 as a function of the measurements by arrangement 14. The flow is passed from pump 10 to arrangement 14 by means of a trough 18 provided with weir 12 and opening 13, and by a trough 19.

Arrangement 14 includes a trough 20 arranged for receiving the diverted flow portion from trough 19 via a chute 21 provided in trough 19. Trough 19 also is provided with a sliding gate 22 which permits the volume of sludge or other material conveyed through trough 20 to be adjusted. Trough 20 is displaceably mounted and defines a flow channel for the diverted flow portion. Arrangement 16 has a balance beam 23 pivotally mounted on a support 24 as by pin 26 and having a counterweight 28 adjustably mounted on a one arm 30 thereof. the other arm 32 is connected to trough 20 by adjustable rod 34 and a bracket 36. This connection causes balance beam 23 to be moved by trough 20. Support 24, which may be a pair of upstanding members as can be seen in FIG. 2 of the drawings, is mounted in a known manner on a support frame 37. Also having one end connected to frame 37 is a damper 38. The other end of damper 38 is connected to arm 30 of balance beam 23. Damper 38 may be of conventional construction and employ a fluid medium such as oil to achieve the dash-pot or damping effect. An air control valve assembly 40 is arranged on frame 37 adjacent arm 32 of beam 23. A line 42 supplies air to assembly 40 from a suitable, known source (not shown), and a line 43 conveys the air to pump 10. A valve 44 is arranged in line 42 for providing an adjustment and an on-off control for assembly 40.

Arrangement 14 also has a trough 46 arranged to receive from trough 20 at least a part of the diverted flow portion. This trough 46 is displaceably mounted to frame 37 at one end, the right end as seen in FIG. 1 of the drawings, as by an adjustably mounted rod 48 and a bracket 50. A spring 52 is arranged at one end of rod 48 for permitting displacement of rod 48, and is adjustably attached in a known manner to a bracket 54 which is in turn mounted on frame 37. Trough 20 is provided with a weir 56 and an oepning 58. The part of the diverted flow portion which flows over weir 56 passes through the aeration tank (not shown), and only the part that flows through opening 58 passes to trough 46.

Troughs 20, 46 are connected together by an arrangement 60 for inversely duplicating in trough 20 a displacement of trough 46. Arrangement 60 is mounted on a bracket 62 which in turn is mounted on a displaceable support assembly 64. To the top of assembly 64 is mounted a damper 66.

As can best be seen from FIGS. 3 to 5 of the drawings, assembly 64 has a pair of longitudinally extending supports 68. These supports 68 mount bracket 62 and arrangement 60 to frame 37. A rod 70 is arranged between supports 68 and is connected at its lower end to trough 46 by means of a bracket 72. The other end of rod 70 is connected to damper 66.

Arrangement 60 includes a plurality of pulleys 74, four being shown in the illustrated embodiment, mounted in a known manner for rotation on support member 76. Support members 76 are in turn connected to bracket 62. A pair of cables 78 are arranged about pairs of pulleys 74 on each support member 76. The ends of cable 78 are attached to troughs 20, 46. By this arrangement, a, for example, downward displacement of trough 46 will pull trough 20 upwardly, and an upward displacement of trough 46 will permit trough 20 to lower under the force of gravity.

Damper 66 is provided with frame 80 to which is connected in a known manner and end of springs 82 and one portion of a dash-pot or fluid damper 84. The other end of springs 82 and damper 84 is connected to a plate 86 which is in turn connected to rod 70. Thus, damper 66 acts to dampen the movements of trough 46.

The arrangement of trough 20 wherein it is connected to arm 32 at one end and to trough 46 at the other end results in only the end connected to trough 46 being displaced by trough 46 and the rate of flow in trough 20 being thus varied.

FIG. 6 of the drawings shows in detail a possible construction for valve assembly 40. This embodiment has a valve 88 with a valve element 90 biased by a spring 92 toward a valve seat 94. Element 90 has a pin 96 projecting therefrom and passing through a bore defined in valve housing 98. A rocker 100 is pivotally mounted to housing 98 as by a pin 102, and is connected to arm 32 as by a link 104. The other end of rocker 100 is provided with a bearing surface 106 which contacts pin 96. As can be readily understood from FIGS. 1 and 6 of the drawings, a movement of beam 23 will cause a proportional movement of rocker 100 resulting in a change of position of element 90 with relation to seat 94. In this manner, the amount of air supplied to pump 10 may be adjusted as a function of the weight of the material being pumped.

To operate the particular embodiment shown in the drawings, slide gate 22 is closed and valve 44 is open to start pump 10. A large volume of sludge or other material pumped by pump 10 will spill over the long sloping side of weir 12 into trough 19. The diverted portion passing into trough 19 will flow through chute 21 and into trough 20. The rate of sludge or other material will pull down arm 32 of beam 23, and element 90 of valve 88 will move toward seat 94. The movement of element 90 will be slow because of damper 38 on arm 30 of beam 23. When valve 88 closes to a point where the air-lift pump 10 pumps just enough sludge or other material so that a small volume will spill over the side of weir 12 and flow through troughs 20 and 46, the weight of that sludge or other material will balance the weight of counterweight 28. Pump 10 will then continue to pump the same volume of sludge or the like. To change the volume of sludge or the like being pumped, slide gate 22 is opened until the desired volume is being pumped. As a matter of normal operation, the sludge or the like varies in thickness and weight. To compensate for such variations, the sludge flows through trough 46 and at least a part thereof passes out of opening 58 and into trough 46. If the sludge flowing through trough 20 and into trough 46 becomes heavier, the receiving end of trough 46 will pull down on rod 48 causing a displacement of spring 52. Trough 46 will thus fill to a weight sufficient to pull down the other end of trough 46. When the other end of trough 46 is displaced downwardly it will cause the adjacent end of trough 20 to be displaced upwardly, resulting in trough 20 holding less fluid. This inverse displacement will cause counterweight 28 on beam 23 to move downwardly and cause valve 88 to open resulting in more sludge or the like being pumped by pump 10. The sludge or the like in trough 46 will discharge as trough 46 moves downwardly until the sludge in trough 46 equals the weight of the sludge or the like in trough 20. The opposite sequence of events occurs when a lighter sludge or the like flows through trough 20 and into trough 46, ultimately causing valve 88 to restrict and effecting a reduction in the amount of sludge or the like being pumped. By proper selection and adjustment of the various elements, including the position of gate 22, in view of experience with a particular plant and in conjunction with routine sewage and waste treatment plant maintenance, any small plant facility provided with apparatus according to the present invention can be made to operate at peak efficiency.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An apparatus, comprising, in combination:
   a. means for making a quantitative measurement of a flow in a flow path, the measuring means continuously making quantitative measurements of a flow portion diverted from the flow path, and including a displaceably mounted trough defining a flow channel connected to the regulating means and arranged for receiving the diverted flow portion, and a further trough arranged to receive from said trough at least a part of the diverted portion, said further trough being displaceably mounted at the ends thereof and connected to said trough at one end for displacing same; and
   b. means for regulating the impetus to the flow in the flow path as a function of the measurement made by the measuring means.

2. A structure as defined in claim 1, wherein the troughs are connected together by a means for inversely duplicating in said trough a displacement of said further trough.

3. A structure as defined in claim 2, wherein said trough is connected to said regulating means at a one end and to said further trough at the other end, this arrangement resulting in only the other end of said trough being displaced by said further trough and the rate of flow in said trough being thus varied.

4. A structure as defined in claim 3, wherein the regulating means includes a pivotally mounted balance beam having a pair of arms, with a weight mounted on one arm and the other arm connected to said trough for movement of said balance beam thereby.

5. A structure as defined in claim 1, wherein said trough is connected to said regulating means at a one end and to said further trough at the other end, this arrangement resulting in only the other end of said trough being displaced by said further trough and the rate of flow in said trough being thus varied.

6. A structure as defined in claim 1, wherein the regulating means includes a pivotally mounted balance beam having a pair of arms, with a weight mounted on a one arm and the other arm connected to said trough for movement of said balance beam thereby.

* * * * *